United States Patent [19]
Schirico

[11] Patent Number: 4,806,736
[45] Date of Patent: Feb. 21, 1989

[54] HEATED DELIVERY BAG

[75] Inventor: John P. Schirico, Elmwood Park, Ill.

[73] Assignee: Jeno F. Paulucci, Sanford, Fla.

[21] Appl. No.: 104,659

[22] Filed: Oct. 5, 1987

[51] Int. Cl.$^4$ .............................................. H05B 3/26
[52] U.S. Cl. .................................. 219/386; 219/521; 219/387
[58] Field of Search ............... 219/521, 385, 386, 387, 219/506, 528, 548, 529; 383/22, 24, 25, 29, 66, 81, 119; 206/545, 548, 549; 229/DIG. 6

[56] References Cited

U.S. PATENT DOCUMENTS

| | | | |
|---|---|---|---|
| 2,608,636 | 8/1952 | D'Albora | 219/528 |
| 3,521,030 | 7/1970 | Maahs | 219/386 |
| 3,721,803 | 3/1973 | DiStefano | 219/387 |
| 3,764,780 | 10/1973 | Ellis | 219/521 |
| 4,134,004 | 1/1979 | Anderson | 219/387 |
| 4,215,267 | 7/1980 | Kaebitzsch | 219/438 |
| 4,293,763 | 10/1981 | McMullan | 219/528 |
| 4,578,814 | 3/1986 | Skamser | 206/545 |

FOREIGN PATENT DOCUMENTS

| | | | |
|---|---|---|---|
| 2521408 | 8/1983 | France | 219/385 |
| 2056264 | 3/1981 | United Kingdom | 219/387 |

OTHER PUBLICATIONS

Commercial Brochure, Hot Food Boxes, Inc., pp. 21–33 (1984).

Primary Examiner—Teresa J. Walberg
Attorney, Agent, or Firm—Willian Brinks Olds Hofer Gilson & Lione Ltd.

[57] ABSTRACT

A portable container for heating and storing pizza includes a fabric box about 20 inches long, about 20 inches wide, and about 8 inches high supported in its four vertical corners by plexiglass strips positioned inside sleeves. A lower rigid panel located at the bottom of the fabric box is used to support a heating unit. An upper rigid panel located above the heating unit forms a compartment with the sides and top of the fabric box large enough to contain two pizzas in their delivery box containers. The heating unit includes an aluminum pan which contains a block of insulation having a one-half inch depression in its upper surface. A silicon rubber heating element is positioned inside this depression. The temperature inside the portable container is maintained between 165°–180° F. The portable container can be carried with one hand when used for delivery of hot pizzas.

27 Claims, 2 Drawing Sheets

HEATED DELIVERY BAG

FIELD OF THE INVENTION

This invention is in the field of packaging and containers. It relates particularly to heated containers for delivering freshly made pizza.

BACKGROUND OF THE INVENTION

In recent years, the home-delivery pizza business has grown to immense proportions. From a business composed primarily of individual operators supplying pizzas in their neighborhoods, the marketplace has evolved into one where several large companies with operations across the United States prepare and deliver pizzas under a single trademark. The best known example of this is probably Domino's Pizza.

An important factor in the success or failure of home delivery pizza operations is the ability (or inability) to deliver piping hot pizzas. A desirable temperature for pizza at the time of delivery is 140° F. or higher. The better the operator is able to maintain a high delivery temperature, the more successful the business becomes.

A variety of containers have been employed for carrying hot pizzas on delivery routes. The simplest are merely insulated bags in which the boxed pizzas are placed. More recently, containers with heating elements in them have also been used.

SUMMARY OF THE INVENTION

The foregoing and other objects are realized in accordance with the invention by providing a pizza container including a fabric bag, structural members associated with the bag for partially rigidifying it, and a heating unit in the bag. In one embodiment of the invention, the bag is fabricated of a heavy cloth material in a box-like configuration. In the preferred embodiment it is about 20 inches long, by 20 inches wide, by 8 inches high. The bag has a 20 by 20 inch top panel, a 20 by 20 inch bottom panel, and three permanent side panels of 20 by 8 inches. A fourth side panel is actually a flap of 20 by 12 inches and is permanently fastened only on its lower edge. The upper edge of this fourth side panel overlaps the top panel and is fastened to the top panel with velcro hook and loop type fasteners.

The three side panels other than the flap have sleeves formed therein along their length. A plexiglass strip 7 inches high by 18 inches long is inserted in each sleeve. These strips impart rigidity to the bag and keep its top panel from collapsing onto its bottom panel, even when the bag is empty of pizza containing boxes.

Resting on the bottom panel, within the bag, is a heating unit. In a preferred embodiment the heating unit comprises an aluminum pan 17 inches by 17 inches across and 1½ inches deep. Seated within the pan, and filling it, is a block of fiberglass insulation.

The block of fiberglass has a depression formed ½ inch deep in its upper surface. Seated in that depression is a silicone rubber heating element. The heating element is preferably a rectangular strip heating element, such as is manufactured by Heatron, Inc. The preferred heating element is composed of a ⅛ inch thick sheet of silicone rubber in which a flexible resistor is embedded. The preferred heating element is about 8 inches wide by 10 inches long. The resistor preferably has resistance of about 3 watts/in$^2$.

The fiberglass insulation estends about 1 inch below the heating element and suports the heating element. By bracing the sides of the bag with a support means such as plexiglass or other substantially rigid strips., and by mounting the heating element so that it is surrounded by fiberglass inslation on all sides except for its exposed top surface, the material of the bag is prevented from coming into contact with the heating element. The aforementioned support means provides an additional safeguard.

The heating unit can be controlled by a thermostat which activates the heating element when the temperature at a preselected location within the bag falls below about 165° F., and shuts the heating element off when the temperature reaches about 180° F. By maintaining this temperature range within the oven, the pizzas contained therein are maintained above 140° F., as is required by the FDA/USDA. An indicator light visible from the exterior through a window in the bag indicates whether the heating element is activated at a given time. The indicator light switches on when the heating element is activated, and switches off when the heating element is turned off (i.e., when the temperature inside the bag reaches 180° F.).

The heating unit is preferably powered externally. A 110/240 volt, 2.3 amp AC receptacle is provided in the heating unit for connection with an external power source. Typically, the temperature inside the bag will rise to 180° F. within 2-3 minutes after the heating unit is plugged into a power source. The container is unplugged from its electrical connection just before loading into the delivery truck.

The preferred embodiment of the invention has a capacity for storing and heating two pizzas at a time, in their delivery box containers. The first pizza is positioned directly above the heating unit and the exposed surface of the heating element. The second pizza is placed directly above the first. The pizza placed directly above the heating unit is the first one to be removed. Upon removal of the first pizza, the second one drops down into the location previously occupied by the first, directly above the heating unit.

A carrying means, positioned at the top of the pizza container, includes a handle connected to four straps. The straps are connected to the four corners of the top of the pizza container. The four straps are preferably composed of a strong material, such as a nylon webbing. This carrying means allows the relatively large pizza container to be carried with one hand. This allows a pizza delivery person to carry up to four pizzas at one time, using both hands.

One or more grommets is positioned in the pizza container to allow moisture to escape. Preferably, these grommets are located in the top panel of the pizza container.

With the foregoing in mind, a principal advantage of the invention is that it provides a container for delivering pizza which keeps the pizza piping hot (i.e. above 140° F.) right up until the moment of delivery , i.e., for up to 30 minutes after the container is unplugged from its power source.

Another advantage of the invention is that it provides a safe, portable pizza container in which the fabric parts of the container are prevented from collapsing onto the heating element.

A third advantage of the invention is that it provides a lightweight pizza container which can be carried with one hand, and which holds up to two pizzas in their individual delivery boxes.

A further advantage of the invention is that it provides a heated pizza container from which excess moisture can escape.

The foregoing and other advantages of the invention will appear in the following detailed description of the preferred embodiments, with reference to the accompanying drawing Figures.

DETAILED DESCRIPTION OF THE PRESENTLY PREFERRED EMBODIMENTS

Figure 1:
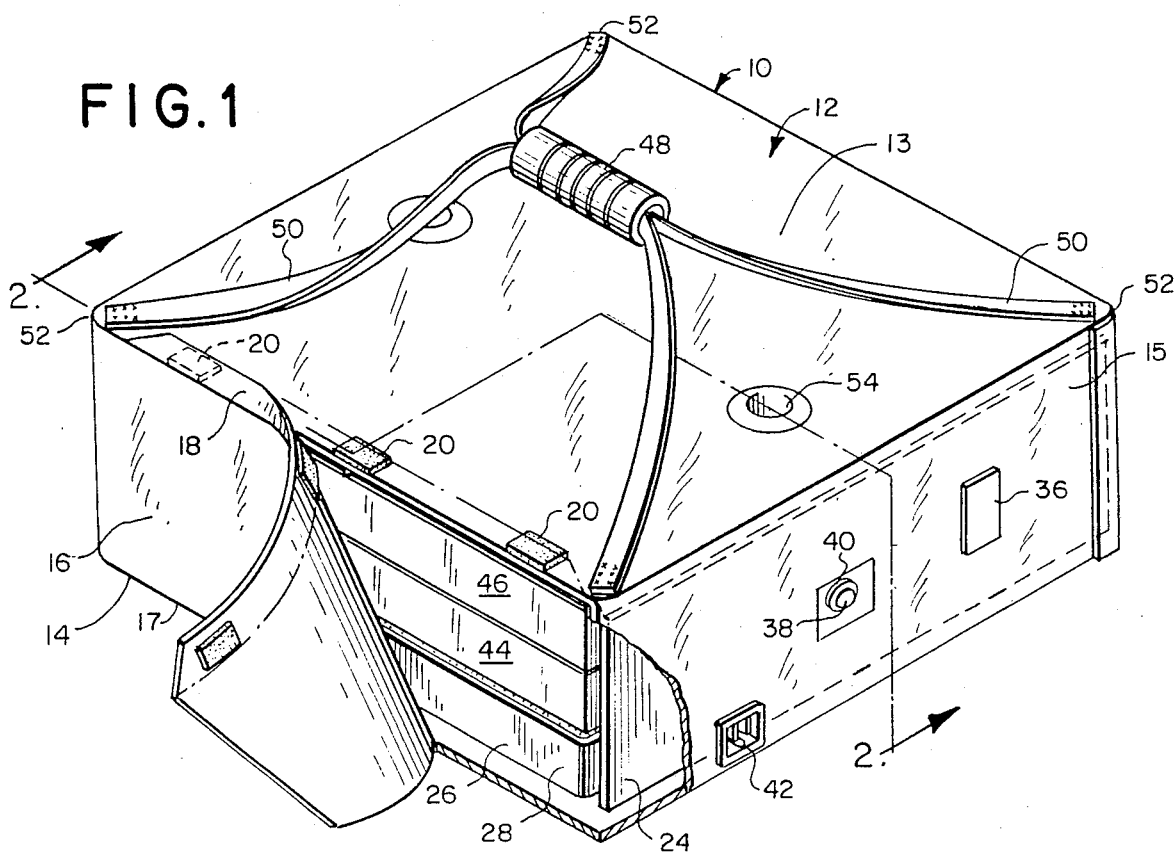
FIG. 1 shows a pizza container embodying features of the invention in top perspective view, with a section cut out from one of the corners exposing the contents.

In the pizza container of FIG. 1, designated generally as 10, a flexible bag 12 constructed from a heavy woven fabric is formed in a box-like configuration. The flexible bag 12 has a top panel 13 and a bottom panel 14, each of which is 20 inches long by 20 inches wide. Three permanent side panels 15 each have dimensions of 20 inches by 8 inches. A fourth side panel 16 forms a flap, 20 inches wide and 12 inches high, which is permanently fastened to the flexible bag 12 only on its lower edge 17. As such, its upper edge 18 overlaps the top panel 13 and is removably fastened thereto by means of velcro fasteners 20. The flexible panel 16 permits insertion and removal of pizzas from the pizza container 10 by simply unfastening and then refastening the velcro fasteners 20.

Figure 2:
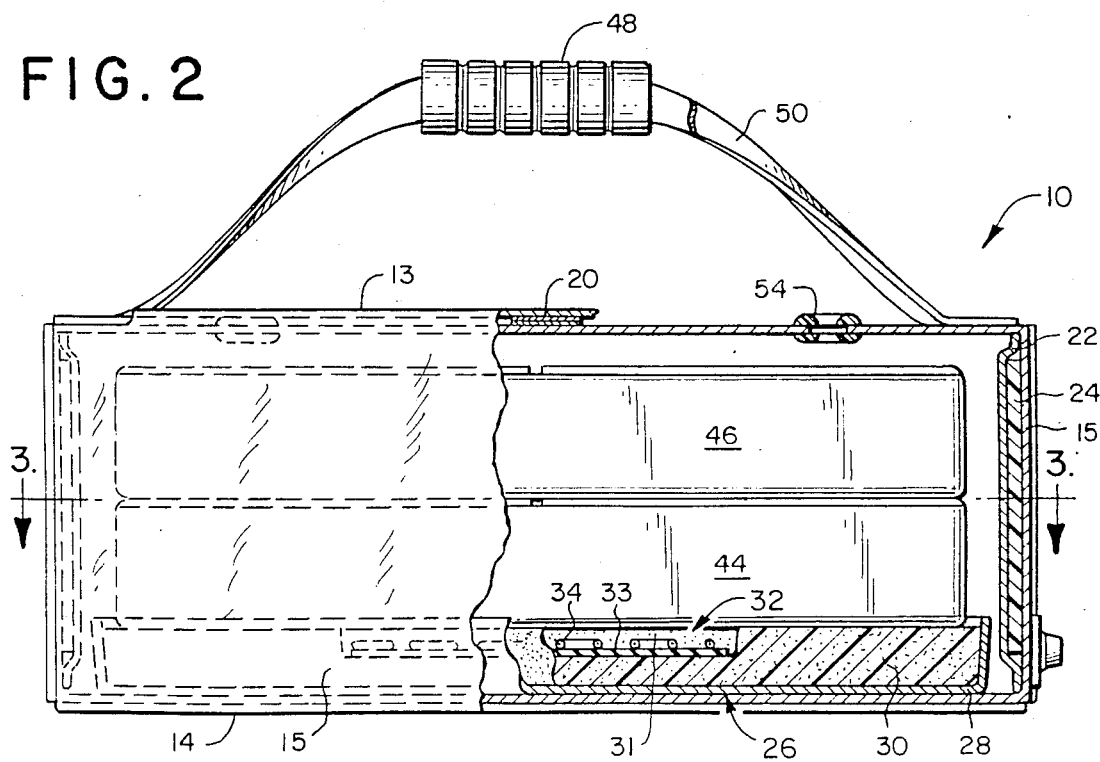
FIG. 2 shows the pizza container of the invention in side elevational view, with a section cut out to expose the contents.

Referring to FIG. 2, the three side panels 15 have sleeves 22 formed therein along their length. A plexiglass strip 24, which is about 7 inches high and 18 inches long, is inserted into each sleeve 22. The plexiglass strips 24 impart a degree of rigidity to the pizza container 10 and keep the top panel 13 from collapsing onto the bottom panel 14.

Figure 3:
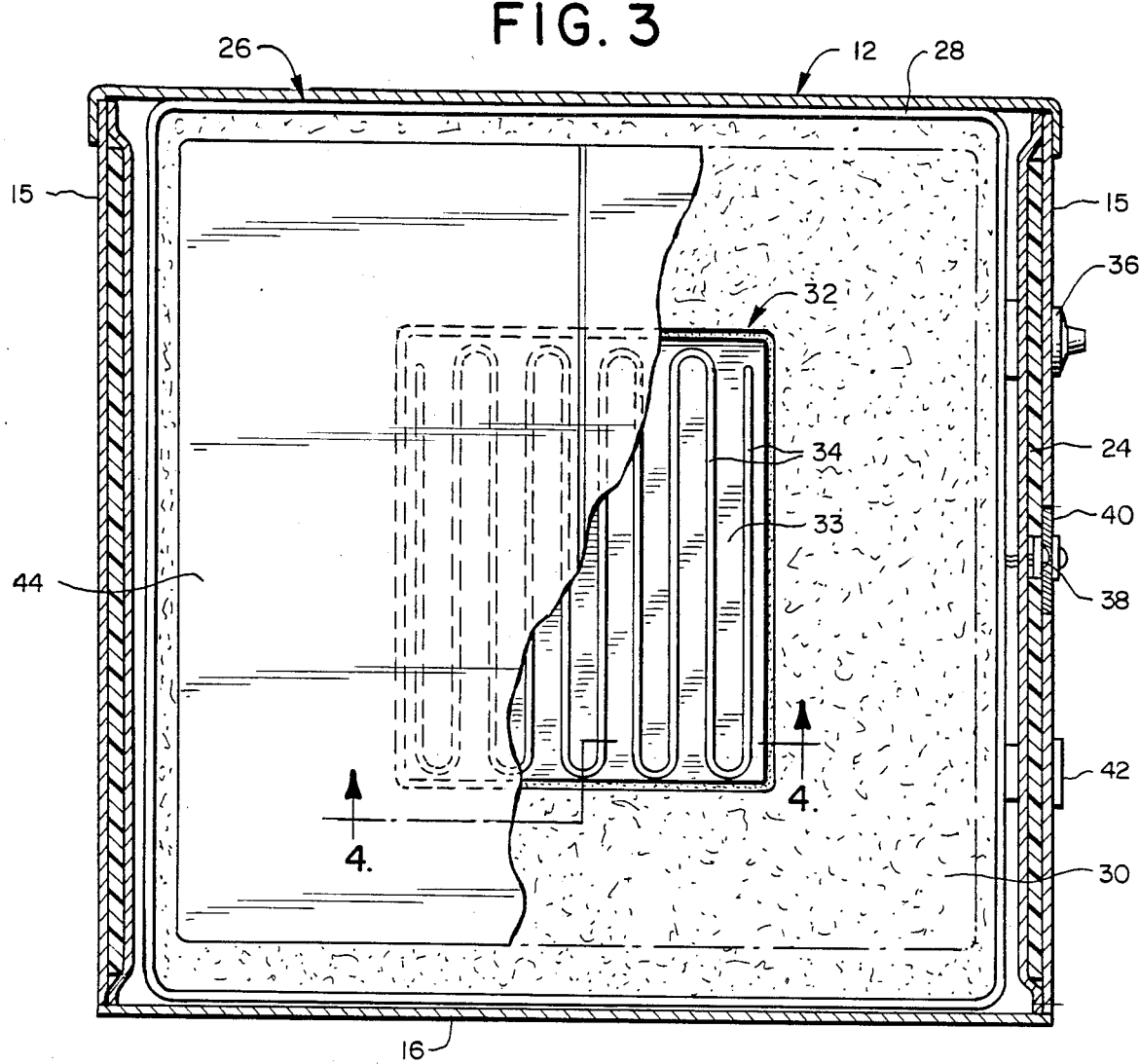
FIG. 3 shows a cross-sectional view taken along line 3—3 in FIG. 2.
Figure 4:
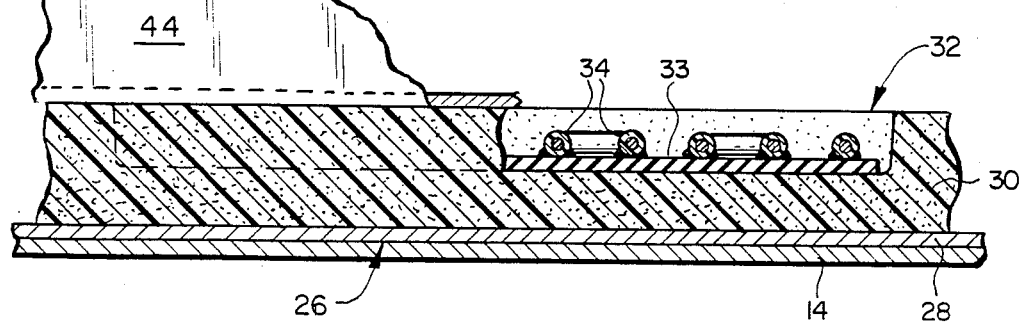
FIG. 4 shows a cross-sectional view taken along line 4—4 in FIG. 3.

Resting on the bottom panel 14, within the flexible bag 12, is a heating unit 26. Referring to FIGS. 3 and 4, the heating unit 26 comprises an aluminum pan 28 about 17 inches by 17 inches across and 1½ inches deep. Seated within the pan 28, and filling it, is a block of fiberglass insulation 30.

The block of fiberglass 30 has a depression 31 about ½ inch deep formed in its upper surface. Seated within the depression 31 is a silicon rubber heating element 32. The heating element 32 is a rectangular strip heating element such as is manufactured by Heatron, Inc. The heating element 32 is comprised of a ⅛ inch thick sheet of silicone rubber 33 into which a flexible resistor 34 is embedded. The heating element 32 is about 8 inches wide by 10 inches long. The flexible resistor 34 has a resistance of about 3 watts/in$^2$.

Referring to FIG. 1, the heating unit 26 is controlled by a thermostat 36 which activates the heating element 32 when the temperature at a preselected location within the pizza container 10 falls below about 165° F., and deactivates the heating element 32 when the temperature climbs to about 180° F. A pilot light 38 visible from the exterior of the flexible bag 12 through a window 40 in a side panel 15 indicates whether the heating element is activated at any given time. The heating unit 26 is powered externally through a 110/240 volt, 2-3 amp male AC receptacle 42, separately connected to an external power source.

The pizza container 10 shown in FIG. 1 contains two delivery boxes 44 and 46 with pizzas (not shown) inside. The first pizza box 44 is positioned directly above the heating unit 26 and the exposed surface of the heating element 32. The second pizza box 46 is placed directly above the first pizza box 44. Upon removal of the first pizza box 44, the second pizza box 46 drops down into the position previously occupied by the first pizza box 44, directly above the heating unit 26.

Carrying means is positioned at the top of the pizza container 10. It includes a handle 48 connected to four straps 50, which in turn are connected to the four corners 52 of the top panel 13 of the pizza container 10. The four straps 50 are preferably composed of a strong material, such as nylon webbing. Two grommets 54 positioned in the top panel 13 of the pizza container 10 allow moisture to escape from the container.

The aforedescribed invention provides a container for delivering pizzas which are piping hot, which maintains pizzas at above the 140° F. guideline set by the FDA/USDA right up until the moment of delivery, i.e., for up to 30 minutes. Because the container is supported on its sides the flexible parts of the container are prevented from collapsing into the heating unit, making the portable container safe to operate and transport even when it is empty of pizzas. The carrying means allows the container of the invention to be easily carried with one hand.

While the preferred embodiment of the invention has been disclosed, it is understood that the invention is not limited to the disclosed example. Modifications in addition to those discussed can be made without departing from the invention. Tjhe scope of the invention is indicated in the appended claims, and all changes that come within the meaning and range of equivalency of the claims are therefore intended to be embraced therein.

I claim:

1. A portable container for maintaining the temperature of freshly baked pizza above a predetermined level during delivery comprising:
    (a) a fabric box having a top panel, a bottom panel, and four side panels;
    (b) an electric heating unit inside box and adapted to be connected to an external power source through said box;
    (c) said heating unit including insulation and a heating element seated in said insulation;
    (d) substantially rigid strips positioned at the four vertical corners of said box and connected to said box for maintaining said side panels sufficiently rigid to prevent said top panel from contacting said heating unit.

2. the portable container of claim 1 wherein said heating element comprises a sheet of silicone rubber about one eighth inch thick, about eight inches long, and about 10 inches wide, and a flexible resistor embedded within sid silicone rubber sheet having resistance of about three watts per squre inch.

3. The portable container of claim 1 wherein said heating unit comprises an aluminum pan about 17 inches long, 17 inches wide, and 1½ inches deep, and a block of fiberglass insulation positioned in said pan and having a depression formed about one-half inch deep in its upper surface, said heating element positioned in said depression.

4. The portable container of claim 1 wherein said fabric box is about 20 inches long, about 20 inches wide, and about 8 inches high, and wherein said rigid strips comprise plexiglass strips.

5. The portable container of claim 4 comprising sleeves at the four vertical corners of said fabric box, said plexiglass strips positioned inside said sleeves.

6. The portable container of claim 1 wherein said bottom panel comprises an about 20 inch by 20 inch rigid panel adapted to support said heating unit and wherein said top panel comprises an about 20 inch by 20 inch rigid panel defining a compartment with a top of said heating unit and sides of said box being adapted to contain at least one pizza packaged in a delivery box container.

7. The portable container of claim 6 wherein said box is adapted to contain two pizzas packaged in delivery box containers.

8. The portable container of claim 1 wherein said side panels comprise three permanent side panels, each about 20 inches long and about 8 inches tall; and one side panel about 20 inches long and about 12 inches tall defining a flap which is permanently fastened to said portable container along an edge and which folds over and is removably fastened to said portable container along an opposite edge.

9. The portable container of claim 8 comprising fastening means for removably fastening said opposite edge of said one side panel to said portable container.

10. The portable container of claim 1 comprising means for activating said heating unit when the temperature at a selected point inside said portable container falls below 165° F. and for deactivating said heating unit when said temperature rises above 180° F.

11. The portable container of claim 10 wherein said means for activating and deactivating said heating unit comprises a thermostat.

12. The portable container of claim 10 comprising an indicator light for indicating when said heating unit is activated and a window, said indicator light viewable from the exterior of said portable container through said window.

13. The portable container of claim 1 comprising at least one grommet positioned in said top panel.

14. The portable container of claim 1 comprising means for carrying sid portable container with one hand.

15. The portable container of claim 14 wherein said means for comprises a handle connected to four nylon straps which in turn are connected to the four corners of sid top panel of said fabric box.

16. The portable container of claim 14 comprising an indicator light for indicating when said heating unit is activated and a window, said indicator light viewable from the exterior of said portable container through said window.

17. A portable container for heating and storing pizza comprising:
(a) a flexible housing;
(b) a heating unit inside said housing comprising an aluminum pan about 17 inches long, 17 inches wide, and 1½ inches deep, and a block of fiberglass insulation positioned in said pan having a depression formed about one-half inch deep in its upper surface;
(c) a heating element positioned in said depression comprising a sheet of silicone rubber about one eighth inch thick, about eight inches long, and about 10 inches wide, and a flexible resistor embedded within said silicone rubber sheet having resistance of about three watts per square inch;
(d) means for activating said heating unit when the temperature at a selected point inside said portable container falls below 165° F. and for deactivating said heating unit when said temperature rises above 180° F., said means comprising a thermostat; and
(e) plexiglass strips for supporting said fabric box positioned at the four vertical corners of said box and connected to said box.

18. The portable container of claim 17 wherein said flexible housing comprises a fabric box about 20 inches long, about 20 inches wide, and about 8 inches high.

19. The portable container of claim 18 comprising sleeves at the four vertical corners of said fabric box, said plexiglass strips positioned inside said sleeves.

20. The portable container of claim 18 wherein said fabric box comprises three permanent side panels, each about 20 inches long and about 8 inches tall; and one side panel about 20 inches long and about 12 inches tall defining a flap which is permanently fastened to said portable container along an edge and which folds over and is removably fastened to said portable container along an opposite edge.

21. The portable container of claim 20 comprising fastening means for removably fastening said opposite edge of said one side panel to said portable container.

22. The portable container of claim 18 comprising means for carrying said portable container with one hand.

23. The portable container of claim 22 wherein said means for carrying comprises a handle connected to four nylon straps which in turn are connected to the four corners of the top of said fabric box.

24. The portable container of claim 17 comprising an about 20 inch by about 20 inch lower rigid panel at a bottom of said fabric box adapted to support said heating unit and an about 20 inch by about 20 inch rigid panel at a top of said box defining a compartment with a top of said heating unit and sides of said fabric box adapted to contain at least one pizza packaged in a delivery box container.

25. The portable container of claim 24 wherein said upper rigid panel defines a compartment with the top of said heating unit and the sides of said box adapted to contain two pizzas packaged in delivery box containers.

26. The portable container of claim 17 wherein said flexible housing comprises at least one grommet.

27. A portable container for heating and storing pizza comprising:
(a) a fabric box about 20 inches long, about 20 inches wide, and about 8 inches high;
(b) plexiglass strips for supporting said fabric box positioned at the four vertical corners of said fabric box and connected to said fabric box;
(c) a heating unit inside said fabric box comprising an aluminum pan about 17 inches long, 17 inches wide, and 1½ inches deep, and a block of fiberglass insulation positioned inside said pan having a depression formed about one-half inch deep in its upper surface;
(d) a heating element positioned in said depression comprising a sheet of silicone rubber about one eighth inch thick, about eight inches long, and about 10 inches wide, and a flexible resistor embedded within said silicone rubber sheet having resistance of about three watts per square inch;

(e) means for activating said heating unit when the temperature at a selected point inside said portable container falls below 165° F. and for deactivating said heating unit when said temperature rises above 180° F.;

(f) an approximately 20 inch by 20 inch lower rigid panel at the bottom of said fabric box adapted to support said heating unit;

(g) an approximately 20 inch by 20 inch upper rigid panel at the top of said fabric box defining a compartment with the top of said heating unit and the sides of said fabric box adapted to contain two pizzas packaged in delivery box containers; and (h) means for carrying said portable container with one hand.

* * * * *

UNITED STATES PATENT AND TRADEMARK OFFICE
CERTIFICATE OF CORRECTION

PATENT NO. : 4,806,736
DATED : February 21, 1989
INVENTOR(S) : John P. Schirico

It is certified that error appears in the above-identified patent and that said Letters Patent is hereby corrected as shown below:

<u>IN THE SUMMARY OF THE INVENTION</u>

In column 1, line 67, please delete "estends" and substitute therefor --extends--.

In column 2, line 2, after "strips" please delete ".".

<u>IN THE DETAILED DESCRIPTION OF
THE PRESENTLY PREFERRED EMBODIMENTS</u>

In column 4, line 36, please delete "Tjhe" and substitute therefor --The--.

In column 4, line 56, please delete "the" and substitute therefor --The--.

In column 4, line 60, please delete "sid" and substitute therefor --said--.

<u>IN THE CLAIMS</u>

In column 5, line 46, please delete "sid" and substitute therefor --said--.

In column 5, line 49, after "for" please insert --carrying--.

UNITED STATES PATENT AND TRADEMARK OFFICE
CERTIFICATE OF CORRECTION

PATENT NO.  : 4,806,736

DATED       : February 21, 1989

INVENTOR(S) : John P. Schirico

It is certified that error appears in the above-identified patent and that said Letters Patent is hereby corrected as shown below:

In column 5, line 51, please delete "sid" and substitute therefor --said--.

Signed and Sealed this

Twelfth Day of November, 1991

Attest:

HARRY F. MANBECK, JR.

*Attesting Officer*     *Commissioner of Patents and Trademarks*